W. CARLTON.
Horse Hay Fork.
No. 71,453.
Patented Nov. 26, 1867.
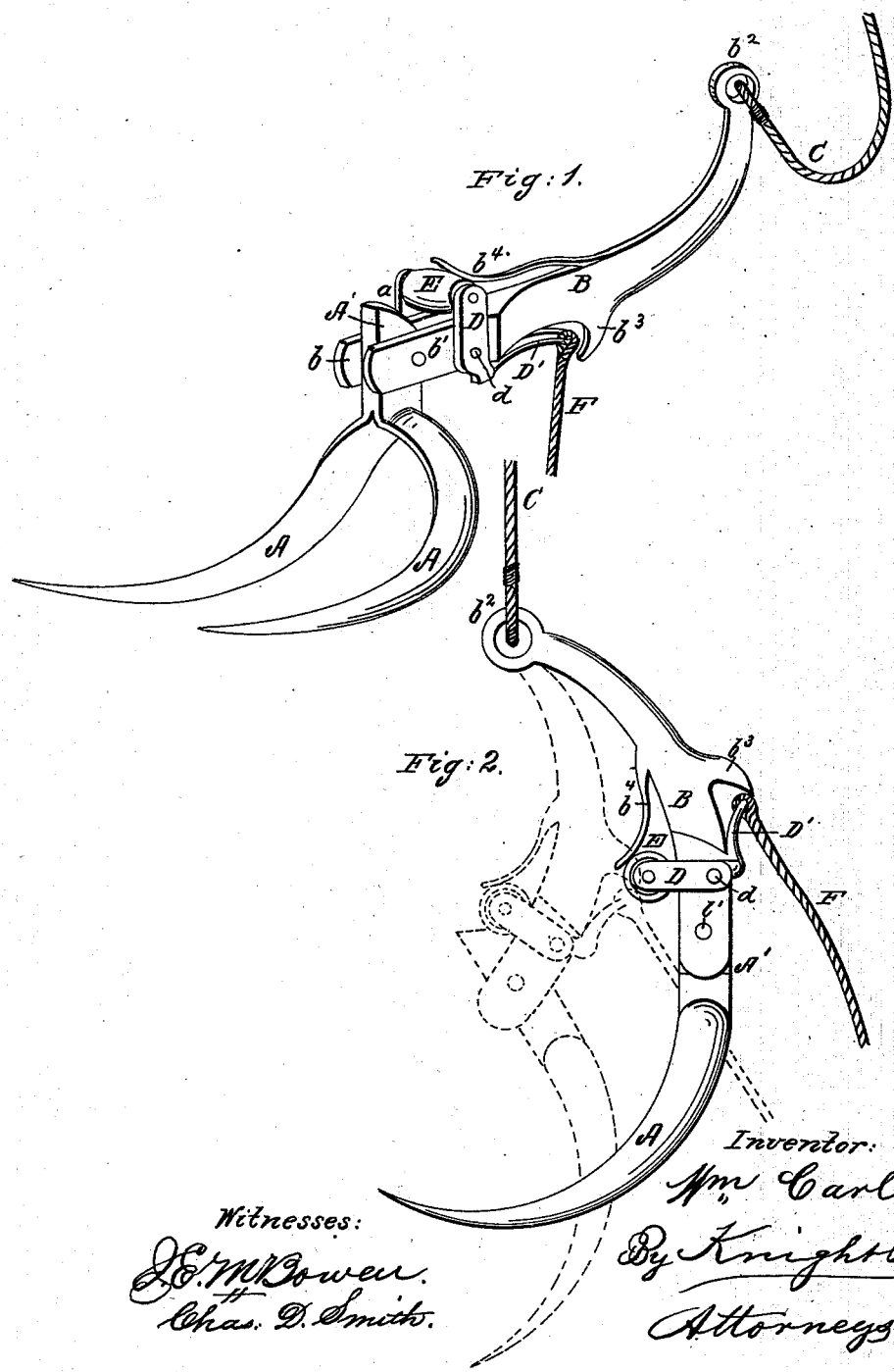

United States Patent Office.

WILLIAM CARLTON, OF ADRIAN, MICHIGAN, ASSIGNOR TO HIMSELF, DANIEL A. LOOMIS, AND ADAM WAGENER, OF SAME PLACE.

Letters Patent No. 71,453, dated November 26, 1867.

IMPROVEMENT IN HORSE HAY-FORKS.

The Schedule referred to in these Letters Patent and making part of the same.

TO ALL WHOM IT MAY CONCERN:

Be it known that I, WILLIAM CARLTON, of Adrian, Lenawee county, State of Michigan, have invented new and useful Improvements in Horse Hay-Forks; and I do hereby declare that the following is a full, clear, and exact description thereof, which will enable others skilled in the art to make and use the same, reference being had to the accompanying drawing, forming part of this specification.

The object of my invention is a horse hay-fork or elevator, of simple construction and operation, and my improvement consists in a novel construction of the latch and the parts which operate it. In the drawings—

Figure 1 is a perspective view of my improved horse hay-fork, showing it in a position to be thrust into the hay.

Figure 2 is a side elevation, representing the fork in the position of carrying and discharging its load.

A A represent the tines, which are welded or otherwise united, so as to form a solid head, A', at their point of convergence, which is made with a bevelled face, $a$, for the purpose of facilitating the action of the latch, as will be presently explained. The head A' of the tines is pivoted at $b^1$ in the slot $b$ in the end of the handle B. This handle is curved sufficiently to hold the tines at a proper angle to carry a large quantity of hay, and is formed at its upper extremity with an eye, $b^2$, to which the elevating-rope C is attached. It is also formed with a projecting guard, $b^3$, to prevent the latch being accidentally raised, and a steel spring, $b^4$, is welded or otherwise attached to it to operate the latch. D represents the latch, which is pivoted at $d$ to the handle B, and whose retaining-face consists of a roller, E, to facilitate its action. The latch is raised by the trip-cord F attached to an eye in the extremity of the lever D', which converges from the rear ends of the sides of the latch. This lever is set at such angle that, when the fork is in its loaded position, as shown in fig. 2, its end will be beneath the guard $b^3$.

The operation is as follows: The fork, being in the position represented by fig. 1, is forced into the hay a sufficient distance, when the handle is raised to the position represented in black lines in fig. 2, the catch being forced back by the bevelled end $a$ of the head of the tines acting on the roller E, and is forced back in front of the head by the recoil of the spring $b^4$. The fork is then raised and conveyed to the place of discharge, when the cord F is pulled, raising the latch D a sufficient distance for the roller E to pass the end of the head A', when the fork assumes the position represented by red lines in fig. 2, and the load is discharged.

Having thus described the nature of my invention, what I claim as new, and desire to secure by Letters Patent, is—

1. The roller E, applied to the retaining-face of the catch D, and adapted to operate substantially as described for the purpose specified.

2. The combination of the head A', having a bevelled end, $a$, latch D D', roller E, and spring $b^4$, arranged and operating substantially as described for the purpose set forth.

WILLIAM CARLTON.

Witnesses:
    NELSON B. FASSETT,
    M. MILLERD.